United States Patent [19]

Seefeldt

[11] Patent Number: 5,067,380
[45] Date of Patent: Nov. 26, 1991

[54] CUTTING MECHANISM FOR MATERIALS IN WEB OR LAYER FORM

[75] Inventor: Joachim Seefeldt, Neuffen, Fed. Rep. of Germany

[73] Assignee: bielomatik Leuze GmbH & Co., Fed. Rep. of Germany

[21] Appl. No.: 487,544

[22] Filed: Mar. 2, 1990

[30] Foreign Application Priority Data

Mar. 11, 1989 [DE] Fed. Rep. of Germany ....... 3908010

[51] Int. Cl.$^5$ ............................................. B26D 1/22
[52] U.S. Cl. ........................................ 83/481; 83/491; 83/505; 403/334
[58] Field of Search ............... 83/481, 331, 343, 344, 83/345, 346, 347, 348, 349, 505, 508, 491; 242/68.4, 58.6, 79; 403/334

[56] References Cited

U.S. PATENT DOCUMENTS 3,545,326  12/1970  Madachy ............................... 83/481
4,681,478  7/1987  Kunz ................................... 242/68.4

Primary Examiner—Frank T. Yost
Assistant Examiner—Kenneth E. Peterson
Attorney, Agent, or Firm—Eckert Seamans Cherin & Mellott

[57] ABSTRACT

A cutting mechanism for slitting superimposed layers of paper webs, with the cutting roller provided as the lower knife or blade shaft, is replaceable in a few minutes by means of a fast assembly device. For this purpose a rapid assembly coupling is associated with each of the journal-free ends of the cutting roller, of which one simultaneously serves as a drive coupling for drive connection with an operating drive. Each coupling has a coupling member, formed by a cone pulley which is mounted in rotary and axially displaceable manner with respect to a base and a fixed coupling member located on the cutting roller, which is constructed as a complementary inner core. For transferring the cutting roller between its fitted position and a removal position, roll or sliding rails are provided, which slightly raise the cutting roller on engaging couplings and therefore make it contact-free. The rails have positioning aids, so that in each case one cutting roller can in simple manner assume its intended position with respect to the base.

29 Claims, 3 Drawing Sheets

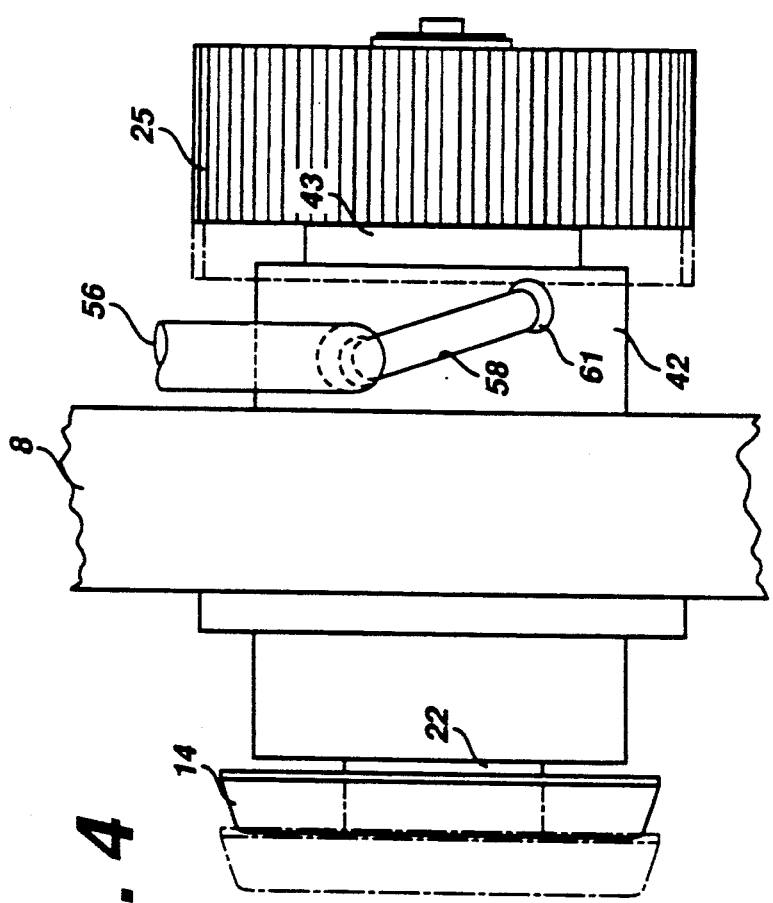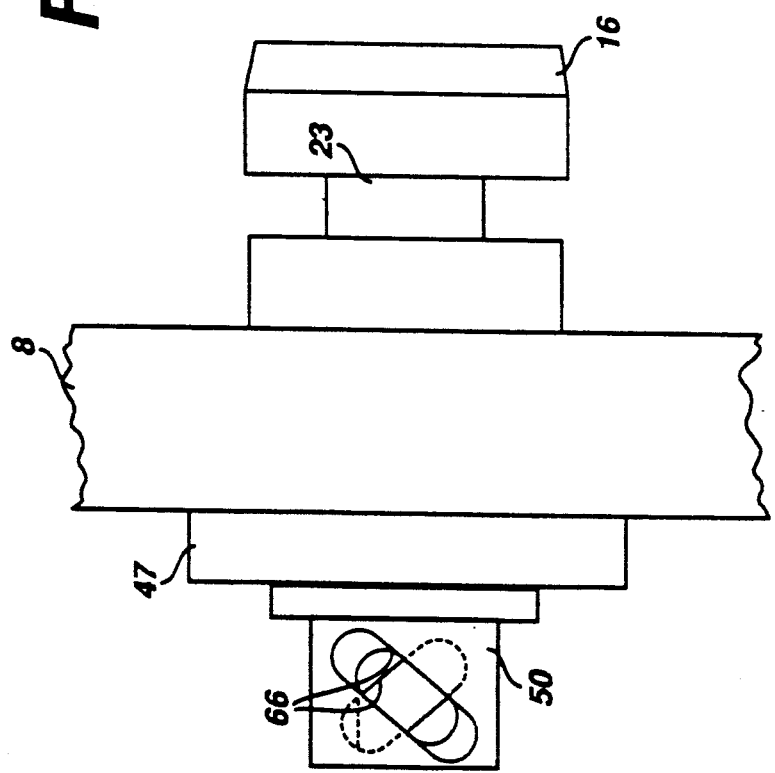

CUTTING MECHANISM FOR MATERIALS IN WEB OR LAYER FORM

BACKGROUND OF THE INVENTION

1. Field of the Invention

The invention relates to a cutting mechanism for materials in web, layer or similar form, which has at least one cutting roller mounted in the vicinity of its ends on a base in the operating position or some similar cutting tool. The cutting mechanism is in particular suitable as a slitting device for small-size cross-cutters, in which e.g. paper webs in several superimposed material layers are slit into individual useful widths during passage in the longitudinal or conveying direction thereof and immediately thereafter said useful widths are cross-cut into individual useful sizes over the entire width of the material webs, so that a plurality of individual useful sizes are formed with in each case block-like, superimposed, equally large material blanks.

2. Prior Art

In the case of cutting mechanisms of the aforementioned type the cutting roller must be mounted on the machine or equipment frame, which e.g. forms the base and must then frequently be disassembled again, e.g. for resharpening or replacing tools which have become blunt, or to reequip the cutting mechanism to different widths of cut.

In the case of known cutting mechanism the assembly and disassembly of the cutting roller are very time-consuming, because initially the driving connection of the cutting roller must undergo assembly or fitting operations at an unfavorable point and then it is necessary to manipulate numerous fastening elements with which the cutting roller is mounted in its operating position. This leads to machine downtimes, which can exceed 30 to 60 minutes.

An object of the invention is to provide a cutting mechanism of the aforementioned type obviating the disadvantages of the prior art. In particular, the cutting roller must be assemblable and also disassemblable in a much shorter time of e.g. only a few minutes.

According to the invention this object is achieved by a cutting mechanism of the aforementioned type, in that means are provided for the rapid fitting or assembly of the cutting roller and which e.g. enable it to be replaced, i.e. both the disassembly and then reassembly in less than 30 or 15 minutes and preferably between approximately 2 and 4 minutes. This leads to correspondingly short machine downtimes for the reequipping of the cutting mechanism, so that the cutting mechanism has much better performance characteristics.

In particularly advantageous manner an assembly device constructed as a replacement device is provided, which has means making it possible, through a very small number and in particular only a single coupling movement per high-speed coupling, to release or engage the connection of the cutting roller to the associated roller bearing or roller drive, or with both simultaneously. Thus, the cutting roller can be freed very quickly from its receptacle determining its axial position relative to the base and can be so radially or axially moved with respect to the base, that on disassembly it can be removed, or on assembly can be transferred into its clearly defined operating position.

In place of an also conceivable rotary coupling movement and/or a coupling movement transversely or radially with respect to the cutting roller axis, a particularly easy manipulation is obtained if at least one and in particular the sole coupling movement per assembly or drive coupling is substantially linear and in particular axially parallel to the cutting roller in the operating position. The coupling members of the coupling are appropriately arranged in such a way that in the released position they are staggered as a whole or axially with respect to one another, so that the cutting roller in the vicinity of said coupling is completely freed for removal or insertion in the assembly position with a corresponding degree of freedom.

In order to be able to assemble and disassemble at least one end of the cutting roller independently of the associated bearing or without the same, the coupling member of said coupling associated with the base is advantageously mounted in rotary manner on the latter, its bearing simultaneously constituting the cutting roller bearing. This coupling member can also be movably mounted for performing the associated coupling movement.

A particularly advantageous further development of the invention involves the coupling members of at least one coupling being located substantially in the axis of the cutting roller in the operating position or being substantially axially symmetrical to said cutting roller axis. For example, the engaging coupling surfaces can be in the form of ring or envelope surfaces optionally surrounding the cutting roller axis, so that, unlike as would also be conceivable, there is no need for coupling members individually distributed in the form of a ring around the cutting roller axis. It is also possible in this case for each coupling to have only two directly detachably engaging coupling parts.

It is also possible for the coupling members of at least one coupling to be located in the assembly or operating position axially outside the actual cutting roller and to be connected thereto, e.g. via a short shaft portion. However, it is particularly advantageous if the coupling members or at least the coupling surfaces of at least one coupling for the cutting roller in the operating position to be located substantially completely within said roller, so that same can have a roller body with a substantially constant external diameter between its two end faces. The roller body can also form a dimensionally stable body, which is either constructed in one piece or is assembled from immovable or rigidly interconnected components, without the actual roller body needing a movable component in the vicinity of the coupling.

For performing the coupling movement, preferably only the coupling member associated with the base for at least one coupling for the cutting roller is movably mounted, which simplifies the operation of the coupling. Instead of this, additionally or only the coupling member of said coupling provided on the cutting roller need be movable for performing the coupling movement, but said coupling member is preferably fixed to the cutting roller or is constructed in one piece with the associated cutting roller portion.

For transferring the coupling between the coupling and the release position, appropriately an actuator is provided, which is connected to or actuated by a drive mechanism, such as e.g. a hydraulic, pneumatic, electromagnetic, electromotive or similar drive and/or is constructed for manual operation and for this has a corresponding easily accessible operating or actuating handle in the immediate vicinity thereof or slightly axially displaced with respect to the associated coupling members.

The rotary movement of the operating handle can be transferred in simple manner via a cam control to the associated coupling member and e.g. the cam control can have as the runner a journal and as the cam a track, which has a slope or rise in the direction of the coupling movement, so that there is a geared down actuating connection.

In order that the coupling cannot be accidentally released in the coupling position, means are provided for securing said coupling position. They can be constituted e.g. by a self-locking engagement of the runner in the cam or by a positive and disengageably engaging blocking element or both, so that it is optionally possible to have a continuous axial adjustment of the cutting roller.

To ensure that the cutting roller is not fitted with its ends positioned opposite to the intended arrangement, appropriately two couplings are constructed differently, so that each coupling member of one coupling cannot be brought into correct operating connection with the corresponding coupling member of the other coupling. This can e.g. be brought about by different size or diameter of the coupling members or the coupling surfaces of the two couplings. According to the invention only two couplings are required for the easily disassemblable and assemblable arrangement, as well as driving connection of the cutting roller, each coupling being located in the vicinity of one end of the cutting roller and only one of these two couplings produces the driving connection with the cutting roller, whilst the coupling member of the other coupling associated with the base is constructed so as to freely rotate. The cutting members of at least one coupling and preferably all the couplings are appropriately located within an envelope surface defined by the outer circumference of the roller body of the cutting roller in the operating position, so that the coupling does not project radially over the outer circumference of the roller body or cutting roller and is instead radially set back with respect thereto.

For securing or fixing at least one coupling member in the coupling position, it can also be spring loaded roughly in the direction of the coupling movement to the coupling position, such a spring loading appropriately only being provided on a single coupling, particularly that which freely rotates or that which is located further from the drive. The coupling members of at least one coupling are appropriately fixed with respect to one another in the coupling position, so that the position of the cutting roller is only precisely determined in its axial orientation or alignment by the couplings.

In addition, the coupling members of at least one coupling appropriately form a self-centring centering device for the cutting roller, so that the radial orientation or alignment of the cutting roller can also exclusively take place through the assembly couplings. In a simple embodiment at least one coupling member of the particular coupling has a frustum-shaped coupling surface, whose average diameter can be much larger than its axial extension. Preferably the coupling member forming the outer cone is positioned on the base, so that the cutting roller only has to have an inner cone at both ends and this is e.g. closed in blind hole-like manner on the bottom.

According to the invention for a cutting mechanism of the described or similar type, an alignment or orientation device is proposed, through which the cutting roller can be at least approximately aligned or oriented with respect to the bearing in the base, if it is released from the said bearing, e.g. by transferring the couplings into the release position. The orientation position of the cutting roller determined by the orientation device is advantageously such that the cutting roller is slightly radially displaced with respect to its operating position, but is so positioned that the coupling members can still be engaged with one another and during the further transfer into the coupling position bring the cutting roller into the axial position belonging to the operating position, as a result of the self-centering action thereof. This also leads to a much simpler and faster assembly of the cutting roller, particularly if the orienting device forms a support for the cutting roller, so that the latter does not have to be oriented with respect to its bearing by manual carrying during assembly or fitting and e.g. rests by the outer circumference of its roller body on the support surfaces, whose position with respect to the base or the bearing is precisely defined.

In order to be able to accurately determine the position of the cutting roller for this orientation, appropriately at least one roll or sliding stop is provided, against, which the cutting roller can engage, e.g. with the outer circumference of its roller body by rolling about its axis. Instead or in addition thereto, appropriately axial guides are provided, with which are associated as opposite surfaces on the cutting roller the end faces of the roller body.

Assembly can be further simplified in that between an area below the base and the area for said orientation of the cutting roller is provided a transfer path for said roller and in particular at least one roll or sliding rail, on which the cutting roller can be moved by rolling backwards and forwards between the two areas. The associated end of this transfer path simultaneously forms the aforementioned support and optionally the sliding stops or axial guides located in the vicinity of the cutting roller ends.

These and other features of preferred developments of the invention can be gathered from the claims, description and drawings and the individual features can be realized either singly or in the form of subcombinations in an embodiment of the invention and in other fields and can represent advantageous, independently protectable constructions, for which protection is hereby claimed.

BRIEF DESCRIPTION OF THE DRAWINGS

The invention is described in greater detail hereinafter relative to non-limitative embodiments and the attached drawings, wherein are shown:

FIG. 4: The detail according to FIG. 3, but in a view turned by 90°.

DETAILED DESCRIPTION OF THE PREFERRED EMBODIMENTS

Figure 1:
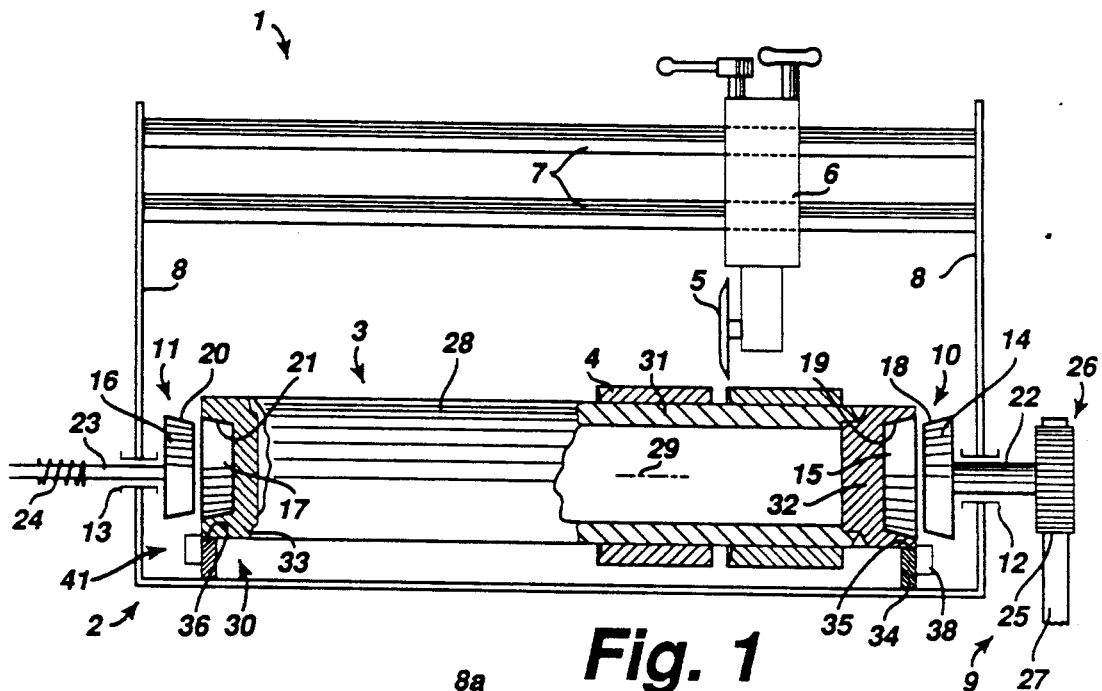
FIG. 1: An inventive cutting mechanism in a simplified view.
Figure 2:
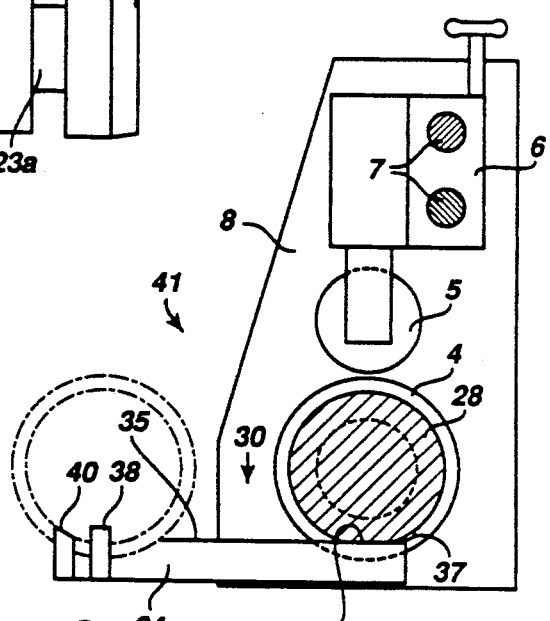
FIG. 2: The cutting mechanism according to FIG. 1 in cross-section.

The cutting mechanism 1 according to FIGS. 1 and 2 has as the base 2, e.g. a machine frame, on which are mounted so as to rotate about horizontal or parallel axes a cutting roller 3 in the form of a lower blade shaft equipped with opposing or mating tools 4 and above the same at least one cutting tool 5. Each cutting tool 5, which is e.g. formed by a rotary knife disk, is adjustably mounted with respect to the cutting roller 3 on a carriage 6 and is adjustable therewith parallel to roller 3 on guides 7 of base 2 and can be fixed in the set position. The mating tools 4 are formed by sleeve-like knife rings, which are arranged in replaceable, as well as axially adjustable or settable manner on the cutting roller 3 and in each case with a terminal edge form the opposite blade for a cutting tool 5. The guide 7 e.g. formed by two superimposed sliding bars is fixed by its ends to side walls or plates 8 of base 2, on which the cutting roller 3 is also mounted in such a way that it can be motor rotated in one operating movement by means of a drive 9.

For the simple and rapidly replaceable reception of the cutting roller 3 in its operating position in cutting mechanism 1 or base 2, there are two equiaxial, facing assembly or fitting couplings 10, 11, whose coupling parts mounted on base 2 in the center axis of the latter determining the operating position of cutting roller 3 face one another without direct connection and are in each case immediately adjacent to the inside of the associated side plate 8. When the cutting roller 3 is in the operating position, coupling members 14, 16 form the sole supporting connection with respect to base 2 and are therefore in each case mounted on the associated side plate 8 so as to rotate about its center axis with one of the two bearings for the cutting roller 3. At each end the cutting roller 3 has an opposite coupling member 15 or 17 for the associated coupling member 14 or 16 and which can be completely released from the opposite coupling member 15 or 17 by a single or linear movement. One of the coupling members is directly connected in non-rotary manner to drive 9 and thus simultaneously forms a coupling member of a disengageable drive coupling.

Each coupling member has a coupling surface 18, 19, 20, 21 in the form of a single circumferential surface, which is constructed as an acute-angled conical surface tapering towards the center of the length of cutting roller 3 and whose cone angle can be so chosen that the engaging coupling members 14, 15 or 16, 17 are at least slightly interconnected in self-locking manner, although it would also be conceivable to have a non-self-locking construction in the manner of a steep-angled cone or taper. The axial extension of the coupling surface 18, 19 or 20, 21 is much smaller than its average external diameter, which is smaller than the external diameter of cutting roller 3 or mating tools 4, but larger than half said external diameter.

The coupling surface 18, 20 of the coupling members 14, 16 mounted on base 2 are outer surfaces, while the coupling surfaces 19, 21 of cutting roller 3 are inner surfaces. The in each case associated coupling surfaces 18, 19 or 20, 21 form in the vicinity of their upper circumferential surfaces wedge surfaces rising with respect to the center axis of the cutting roller 3 and which can also be engaged if the cutting roller 3 within a specific, maximum eccentricity is not equiaxial to the bearing axis or slightly lower than the same. With such a positioning of the cutting roller 3, during the engaging movement of the particular coupling 10 or 11 the cutting roller 3 would be raised on the associated end independently of the other end, until with the coupling 10 or 11 completely engaged it would be oriented in equiaxial manner to the bearing axis. Thus, for transferring the cutting roller 3 from its readiness position into the operating position through the coupling 10 or 11, a lifting and centering device is formed, which as a result of the oblique planes formed by the wedge surfaces acts in a geared down manner.

The coupling member 14 of coupling 10 mounted on base 2 is provided at the inner end of a shaft 22, which is mounted in rotary manner in bearing 12 and is axially displaceable with the coupling member 14 for performing the coupling movement. In the disengaged position the coupling member 14 is spaced from the associated end face of cutting roller 3, so that the latter is completely freed.

The coupling member 16 of the other coupling 11 mounted on base 2 is provided at the inner end of a shaft or axis 23, which can also be mounted in rotary manner on the associated side plate 8, but appropriately is arranged in a substantially non-rotary manner on the base or does not rotate with the cutting roller 3 and coupling member 20. Thus, coupling member 20 is advantageously mounted in rotary manner on the end of shaft 23, whilst the latter is mounted in axially displaceable manner on the side plate 8 for performing the coupling movement. In order to compensate any movement clearance, reliably hold the coupling member 16 in the engaged state and facilitate the coupling movement, with said coupling member 16 is appropriately associated a spring 14 located in the bearing axis and which keeps the shaft 23 under an initial tension in the coupling position direction.

On the outer end of shaft 22 of coupling 10 located outside the associated side plate 8 is provided a pinion 25 of a gear 26 of drive 9 in non-rotary manner, which is constructed as a toothed belt gear and can be driven by means of a belt 27. Pinion 25 is rigidly connected to the coupling member 14, also in the direction of the bearing or roller axis 29, so that it is axially moved with the coupling member 14 on performing the coupling movement. In the engaged position the two coupling members 14, 16 are substantially rigidly fixed with respect to base 2 in connection with the axial orientation thereof, so that they precisely determine the axial position of the cutting roller 3 and therefore the opposing tools 4.

Over its entire length, the cutting roller has a substantially cylindrical roller body 28 which, for reasons of simplicity in FIG. 2 is shown as a solid section, but appropriately according to FIG. 1 is hollow over at least part of its length, namely being formed by a tubular portion 31 extending over most of the length of cutting roller 3. At the end of said tubular portion 31 is rigidly fixed by means of a circumferential weld or the like an end piece 32 or 33 closing or sealing the same and which appropriately has the same external diameter as the tubular portion 31 and forming the in each case associated coupling member 15 or 17 of cutting roller 3. For this purpose the end piece 32 or 33 is cross-sectionally cup-shaped, the inner circumference of the cup opening forming the associated coupling surface 19 or 21.

It is also conceivable to construct the engaging coupling surfaces 18, 19 or 20, 21 of one of the two couplings 10, 11 in complementary toothed manner, so that a positive driving connection is obtained. Moreover, if a precisely predetermined rotary orientation of the cutting roller 3 relative to coupling members 14, 16 is required, with the coupling members of one or both couplings 10, 11 can be associated engaging rotation orientation members, e.g. an axial key engaging in a keyway, so that the cutting roller 3 can only be connected to the associated coupling member of base 2 in one or more precisely predetermined rotary orientations and the torque is transmitted in positive manner.

Appropriately an orienting or aligning device 30 is provided for orienting or aligning the cutting roller 3 with respect to the bearing axis or coupling members 14, 16 prior to coupling and which, by means of stops, guides or support faces, determines the readiness position of roller 3 at right angles to the roller axis 29 and/or parallel thereto in precise manner relative to base 2 or bearings 12, 13. This orienting device 30 has two web-like sliding rails 34 immediately adjacent to the annular end faces of roller body 28 and whose one ends are located below the bearing axis of bearings 12, 13 and whose other ends are outside the base 2 or the side plates 8. The upper, parallel longitudinal edges of these sliding rails 34 form support and sliding faces 35 for supporting the outer circumference of cutting roller 3 or end pieces 32, 33, so that they can be rolled or slid out of their readiness position between the side plates 8, in which the roller axis 29 is positioned with a limited spacing roughly vertically below the bearing axis, into an easily accessible starting position outside plates 8 or vice versa.

For fixing the cutting roller 3 in the readiness position, sliding or roll stops 37 project at the end of the sliding rails 34 over their roll or sliding faces 35, the latter forming at said ends supports for the cutting roller 3 in the readiness position. For orienting the cutting roller 3 in its axial direction, axial guides 38 are provided at least on part of the length of sliding rails 34 and in particular at least the outer ends and/or in the vicinity of support 36 and the guide faces thereof are associated with the end faces of roller body 28.

In order that the cutting roller 3 is oriented axially with respect to the cutting mechanism 1 on setting down or placing in the starting position, preferably at the outer ends of the sliding rails 34 axial orienting means 38 are provided, which engage over the end faces of roller 3. For the starting position, it is also appropriate to provide a rolling or sliding preventer 40, e.g. in the form of a stop, so that the cutting roller 3 cannot accidentally drop from the faces 35 and its mating tools 4 always remain contact-free.

As a result of the described construction a rapid assembly or fitting device 41 is provided, which functions in the following way. If a cutting roller 3 is in the operating position in cutting mechanism 1, then the coupling members 14, 16 of the separately operable couplings 10, 11 are axially moved apart in opposite manner, so that the roller 3 drops slightly until it is located on supports 36, before it is completely freed from the coupling members 14, 16. Thus, the cutting roller 3 is secured with respect to its weight support independently of the bearings 12, 13, so that the coupling members 14, 16 can be completely disengaged from the roller 3, which can then be moved at right angles to roller axis 29 to the starting position with respect to the coupling members 14, 16 by rolling or sliding on rails 34. It is removed there and then the cutting roller to be used as a replacement or for fitting is inserted and oriented by the aforementioned positioning aids.

The cutting roller can now be rolled on roll faces 35 to the said readiness position, the axial orientation thereof being maintained by the axial guides 38, whilst their radial orientation is determined by the roll stops 37. The coupling members 14, 16 are now reengaged by reciprocal axial movement. Their upper area firstly engages with the coupling members 15, 17 of cutting roller 3, so that they raise the latter slightly, which frees it from supports 36 or makes it contact-free from rails 34, up to a few mm being adequate for this. An adequately precise axial orientation of the cutting roller 3 is brought about by the coupling members 14, 16 engaged in the end position. Following the cutting roller change, the cutting tools 5 serving as the upper knives must be axially adjusted relative to the mating tools 4. However, it is also conceivable only to provide one coupling with conical coupling members, while the other coupling has axially adjustably meshing, e.g. substantially cylindrical coupling members, so that the cutting roller 3 can be axially precisely adjusted with the aid of the couplings. In order to facilitate the axial displacement of the coupling member 14 associated with drive 9, a not shown idler pulley for the belt 27 can be provided in a detachable manner, so that belt 27 then has a correspondingly higher movement flexibility. The described cutting roller change can take place in two to four minutes. The described engagement and disengagement of the couplings 10, 11 is preferably performed in successive manner and advantageously first the coupling 10 and then coupling 11 is engaged.

To ensure that the cutting roller 3 is not accidentally inserted with interchanged ends, the widths or diameters of the coupling members 15, 17 or their coupling surfaces 19, 21 are made significantly different, so that the coupling member 15 or 17 can only be engaged with the associated coupling member 14 or 16 of base 2. Coupling members 14, 16 are also constructed in a correspondingly different manner. At least coupling member 14 is in the coupling position approximately completely located within the roll body 28 or the associated end piece 32, so that a very compact construction in the axial direction is obtained. The smallest diameter of the larger coupling member 14 is larger than the largest diameter of coupling member 17.

Figure 3:
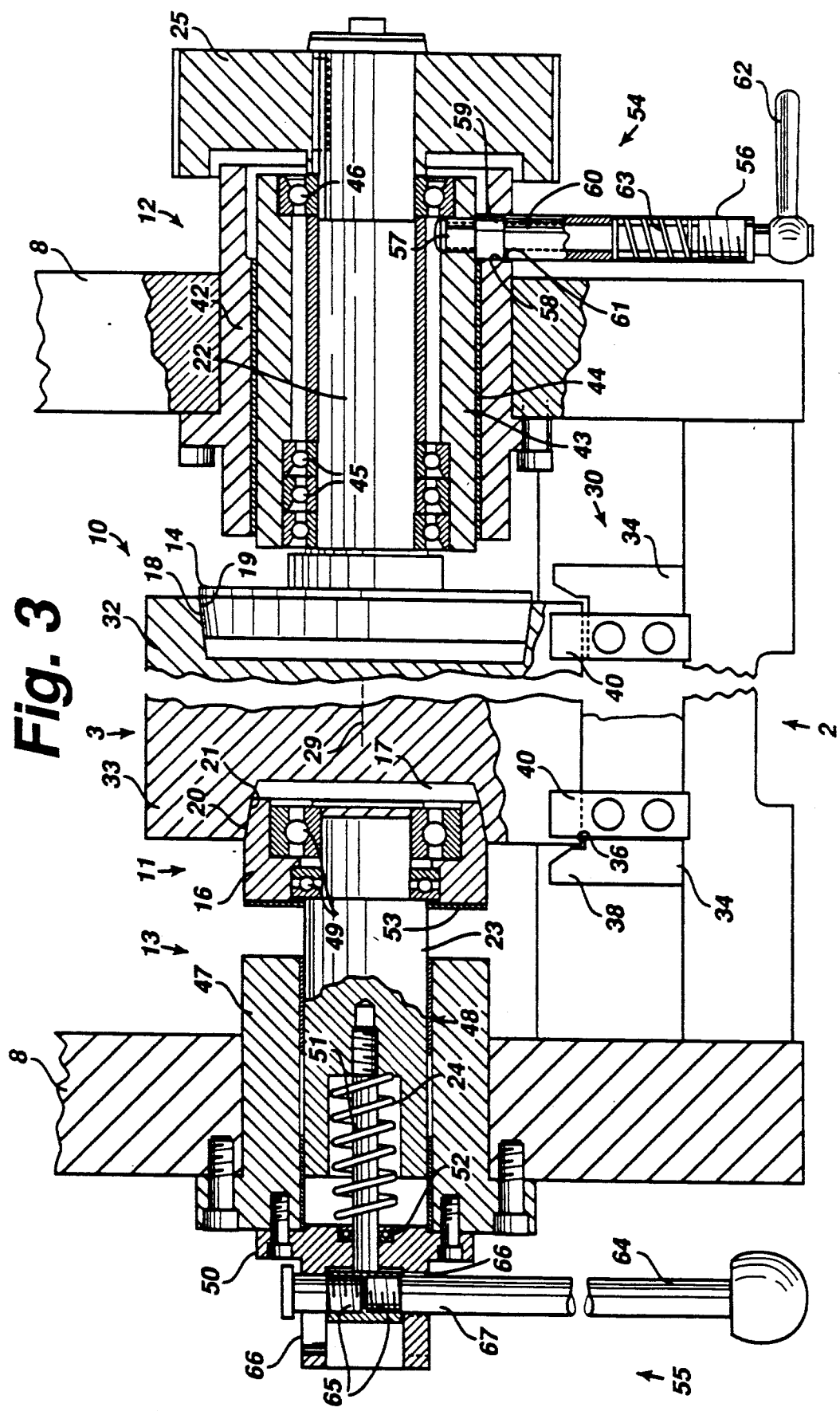
FIG. 3: A detail of FIG. 1 on a larger scale and substantially in axial section.

Whereas FIG. 1 shows the couplings 10, 11 in the disengaged state, FIG. 3 shows them in the engaged state, whilst FIG. 4 shows the arrangement without a cutting roller.

For forming the bearing 12 for the coupling member 14 is provided a collar 42 passing through the associated side plate 8 and fixed against its inside and in which a bearing sleeve 43 is mounted in axially displaceable and limitedly rotatable manner, accompanied by the interposing of a very thin sliding sleeve 44. Shaft 22 is located within the bearing sleeve 43 and is mounted in rotary manner with respect to the latter with roller bearings 45, 46 in the vicinity of the two ends thereof and which are constructed as axial and radial bearings. Pinion 25 is located immediately adjacent to the outer, projecting end of collar 42 and can slightly engage over this end of the outside when in the coupled state.

For forming the bearing 13 is provided a collar 47 passing through the associated side plate 8 and fixed against the outside thereof and in which the shaft 23 is axially displaceably and limitedly rotatably mounted directly through interposing thin sliding sleeves 48. The rotary bearing used for rotating the coupling member 16 or the cutting roller 3 is provided substantially within the coupling member 16 in the form of two immediately adjacent roller bearings 49, which are inserted from both end faces in the substantially one-part coupling member 16 and form both a radial bearing and an axial bearing. In the end of shaft 23 remote from coupling member 16 is inserted a ram shaft 51 equiaxial thereto and which engages with a threaded end portion in the vicinity of a base surface of a terminal depression of shaft 23 and is surrounded by spring 24 in the form of a helical compression spring and which is consequently partly located in the depression.

The rear end of the spring 24 projecting over shaft 23 is supported with an initial tension on a step bearing 52 constructed as an axial bearing and which is inserted in the inner end face of a socket-like abutment 50 which, equiaxial to collar 47, is fixed to its outer end and is at least partly traversed by the ram shaft 51 guided therein. The front end of spring 24 bears on the bottom of the depression. On the rear or outer end face of the coupling member 16 is provided a slip ring 53, with which the coupling member 16 can strike in its axially outermost end position on the inner end face of collar 47. The described bearings lead to a very compact, stable and easily fittable construction, together with a high running precision of the cutting roller 3. As a result of the single spring 24, not only are the two couplings held in clearance-free manner in the engaged state, but a reliable transmission of the driving torque from the coupling surface 18 to the coupling surface 19 is ensured.

For operating or actuating the coupling 10 or 11, is provided a separate actuator 54 or 55 located close to the associated coupling member 14 or 16, which can be operated manually immediately adjacent to the outside of the associated side plate 8. The actuator 54 for the coupling 10 has a rod or stick grip 56 as a handle and which projects substantially radially over the outer end of the coller 42 and which with its inner shaft part traverses the collar 42 and is connected by a threaded journal 57 or the like formed by the inner end of aid shaft part in a substantially rotation-locked and axially positive manner to the rear end of the bearing sleeve 43 by engagement in a radial taphole. The position of journal 57 is fixed in its axial direction with respect to the bearing sleeve 43. Immediately adjacent to the journal 57, the shaft forms a slightly larger diameter, substantially cylindrical runner 59, which engages in a gradient or slope 58 in the casing of collar 42. The slope is formed by the facing longitudinal boundaries of a slot traversing the casing of collar 42, which is provided with a gradient in the axial direction of the bearing axis and is traversed by the inner shaft part of grip 56 having the journal 57. The rod grip 56 is shown directed downwards, to make the drawing easier to understand, but is appropriately positioned roughly horizontally, so that it projects to the side, cf. FIG. 2, in which also the sliding rails 34 project, so that from a standing position the coupling can be operated, the cutting roller removed and also inserted.

By rotating the rod grip 56 about the bearing axis, the runner 59 performs an axial movement with respect to collar 42 or side plate 8 and rotates bearing sleeve 43 and the coupling member 14 axially fixed with respect thereto in such a way that sleeve 43 also performs the limited rotary movement of grip 56. For the positive fixing of at least one axial or end position of coupling member 14 and in particular its engaged and/or disengaged position, on the grip 56 is provided a locking member 60, which is formed by the end of a casing surrounding in axially displaceable manner the inner shaft and which is adjacent to runner 59 and this can form the actual gripping part of grip 56. With the locking member 60 is associated in the vicinity of at least one end of the slope 58 a locking opening 61 for positive engagement purposes and this is formed by countersunk hole-like widening of the slot on the outer circumference of collar 42. With the aid of a cross-grip 62 located on the outer end of the rod grip 56, the locking member 60 can be drawn back from its engagement in the locking opening 61 against the tension of a restoring spring 63 and under the tension of the latter automatically jumps into the locking position on reaching opening 61. Restoring spring 63 surrounds the inner shaft part and is located within the casing surrounding the same.

Actuator 55 is constructed in a similar manner, but has two facing, equiaxial runners 67, which in one of two facing slopes 66 engage in an outer, sleeve-like end portion of abutment 50 and within said end portion are inserted in each case with a threaded journal 65 into a terminal head of the ram shaft 51. One runner 67 is formed by an associated end portion of the rod grip 64, which appropriately projects in the manner described relative to rod grip 56. The gradient of slopes 66 is appropriately so small that the runners 67 are self-locking, i.e. engage in such a way that in the case of axial loading by the ram shaft 51 or the coupling member 16 are fixed by a friction grip with respect to the slopes 66.

Figure 5:
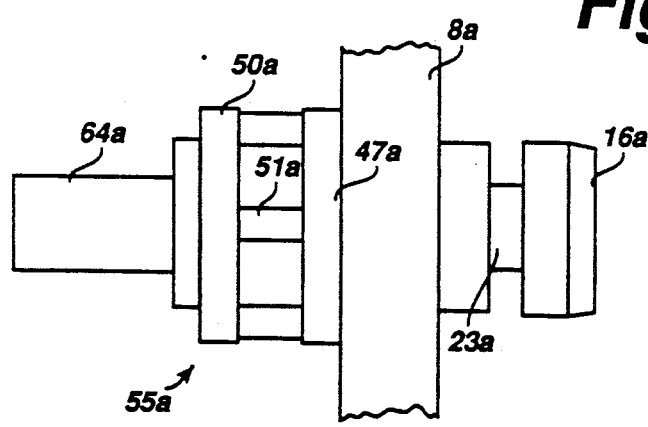
FIG. 5: Another embodiment in detail form corresponding to FIG. 4.

FIG. 5 shows another embodiment of an actuator 55a, which functions pneumatically or hydraulically. For this purpose on the outer part of the collar 47a mounting the shaft 23a with coupling member 16a on side plate 8a, is fixed a support 50a for an operating cylinder 64a, whose piston rod 51a, is e.g. connected to shaft 23a in the manner described for the ram shaft 51.

I claim:

1. a cutting mechanism for web or layer materials comprising:
    a base a cutting roller having roller ends and mounted on said base in a vicinity of said roller ends in an operating position at least one rapid assembly coupling having operationally disengageable first and second coupling members for mounting and detaching at least one associated section of said cutting roller by moving at least one of said first and second coupling members in an axial coupling movement, and drive means providing a drive connection for driving said cutting roller, via a disengageable drive engagement of disconnectably interengaging first and second drive faces, said first and second drive faces defining a disengagement movement provided for disengaging said first drive faces from said second drive faces,
    wherein at least one of said drive faces is operationally displaceably mounted on said base to perform said disengagement movement with respect to said base, said disengagement movement being an axial movement.

2. The cutting mechanism according to claim 1, wherein said drive means includes means for entirely detaching said cutting roller, said means having said first and second drive faces, at least one of said first and second drive faces being operationally movably mounted with respect to said base between a coupling position and a release position operationally disengageably mounting and rotationally drive connecting said drive faces.

3. The cutting mechanism according to claim 1, wherein at least one of said first and second drive faces are operationally movably mounted on said base substantially linearly and axially parallel to said cutting roller when in said operating position.

4. The cutting mechanism according to claim 1, wherein in an axially retracted release position at least one of said first and second drive faces is completely axially displaced with respect to an associated end face of said cutting roller when in said operating position.

5. The cutting mechanism according to claim 1, wherein said first and second coupling members of at least one coupling unit are rotationally and operationally axially displaceably mounted on said base substantially on a side plate adjacent to an associated end of said cutting roller.

6. The cutting mechanism according to claim 1, wherein said at least one coupling member of said at least one coupling unit for said cutting roller is mounted with a rotational bearing for rotationally supporting said cutting roller with respect to said base via said at least one coupling member providing said first drive faces.

7. The cutting mechanism according to claim 1, wherein said first and second drive faces are located in a roller and bearing axis of said cutting roller and substantially axially symmetrical to said axis, said disengagement movement being directed parallel to said axis.

8. The cutting mechanism acording to claim 1, wherein said at least one coupling unit for said cutting roller substantially only comprises two coupling members exclusively two coupling members mounted on said base being axially movably mounted for performing said coupling movement one of said two coupling members providing said first drive faces.

9. The cutting mechanism according to claim 1, wherein in said operating position at said first and second drive faces are located substantially within said cutting roller, having mandrel-free ends with depressions for receiving coupling members mounted on said base.

10. The cutting mechanism according to claim 1, wherein said at least one coupling member of said at least one coupling unit for said cutting roller has at least one conical coupling surface, said first coupling member providing said first drive faces being frusto-conical and said second coupling member as a complementary inner cone having an axial extension substantially smaller than a medium diameter of said inner cone.

11. The cutting mechanism according to claim 1, wherein said at least one coupling member of said at least one coupling unit for said cutting roller is substantially completed constructed in one piece with an associated end of said cutting roller, having at both ends at least one of means provided by inner cones and end pieces fixed to a tubular central portion said means providing one of said first and second drive faces.

12. The cutting mechanism according to claim 1, wherein said at least one coupling member of said at least one coupling for said cutting roller is spring loaded to an engagement position of said first and second drive faces.

13. The cutting mechanism according to claims 1 or 12, wherein for performing said axial coupling movement, said first drive faces are operationally displaceably mounted on said base, means being provided for axially fixedly securing said drive faces with respect to said base for forming an axially positionally fixed axial orienting member for said cutting roller in a coupling position.

14. The cutting mechanism according to claim 1, wherein one coupling member of a coupling unit for said cutting roller is mounted on said base and is spring loaded, a further coupling member providing said first drive faces also being operationally axially displaceably mounted on said base and being axially fixed in the operating position.

15. The cutting mechanism according to claim 1, wherein coupling members operationally axially disconnectably interengaging in said operating position of said cutting roller are simultaneously rotary drive coupling members coaxial with said cutting roller and detachably supporting said cutting roller with respect to said base, said drive coupling members forming said first and second drive faces.

16. The cutting mechanism according to claim 15, wherein said first drive faces are provided to be connected to a drive of the cutting mechanism also when said coupling unit is in a released position, a common single and substantially linear release movement of said first drive faces with respect to said base being provided for separating said first and second drive faces.

17. The cutting mechanism according to claim 1, wherein said drive connection is provided by at least one coupling unit having common coupling faces for commonly providing a rotational support for bearing and said drive connection of said cutting roller.

18. The cutting mechanism according to claim 1, wherein one coupling member of at least one coupling unit for said cutting roller is mounted on said base and is movable between a coupling position and a release position, a further coupling member being immovably fixed to said cutting roller, one coupling member of said at least one coupling unit providing one of said first and second drive faces.

19. The cutting mechanism according to claim 1, wherein at least one coupling unit for said cutting roller extends at most up to an outer circumference of a roller body of said cutting roller, said at least one coupling unit providing said first and second drive faces.

20. The cutting mechanism according to claim 1, wherein two coupling units are located in the vicinity of said roller ends of said at least one cutting roller and have differently dimensioned coupling members, thereby providing means for permitting operational mounting of said cutting roller with respect to said base in only one of two inverted orientations of said roller ends.

21. The cutting mechanism according to claim 20, wherein the coupling members of a first coupling unit have a substantially larger diameter than those of a second coupling unit.

22. The cutting mechanism according to claim 1, wherein at least one coupling member of at least one coupling unit for said cutting roller is operationally rotatably mounted by roller bearings on a support movable and substantially axially displaceable with an actuator device, with respect to said base.

23. A cutting mechanism for web or layer materials comprising:
a base;
a cutting roller having roller ends mounted on said base in a vicinity of said roller ends in an operating position, at least one rapid assembly coupling for mounting and detaching at least one associated section of cutting roller by a coupling movement, and drive means providing a drive connection for driving said cutting roller, wherein means are provided for separating said drive connection of at least one coupling by said coupling movement, at least one coupling member of at least one coupling unit for said cutting roller being mounted in a rotary manner on a support movable and substantially axially displaceable with an actuator device, said actuator device having a runner mandrel displaceably engaging in a slope slot of a mounting collar for said support, said runner mandrel being positively connected to said coupling member in an actuating direction and being located on a freely projecting rod grip provided for axially displacing said at least one coupling member.

24. The cutting mechanism according to claim 22 or 23, wherein said actuator device is provided on an outside of said base and in a vicinity of an end of said support remote from said coupling member, said base providing the base of said cutting mechanism.

25. The cutting mechanism according to claim 22 or 23, wherein said actuator device is constructed for a manual actuation of said coupling member, via a lever handle.

26. The cutting mechanism according to claim 22 or 23, wherein said actuator device has a runner quided on a slope, provided by facing boundaries of a slot transversing a casing member.

27. The cutting mechanism according to claim 1 or 26, wherein a locking mechanism is provided for axially fixedly securing a said at least one coupling member of at least one coupling unit for said cutting roller in said operating position, with respect to said associated mounting body, said at least one coupling member being operationally axially displaceable in an unlocked condition of said locking mechanism.

28. The cutting mechanism according to claim 27, wherein said locking mechanism is formed by self-locking engagement between an actuating runner and a slope, said actuating runner being displaceable with respect to said slope for releasing said coupling member.

29. The cutting mechanism according to claim 27, wherein said locking mechanism has a separate locking member for positively locking said coupling member in said operating position, said locking mechanism being manually operable by a grip.

* * * * *